United States Patent Office 3,484,705
Patented Dec. 16, 1969

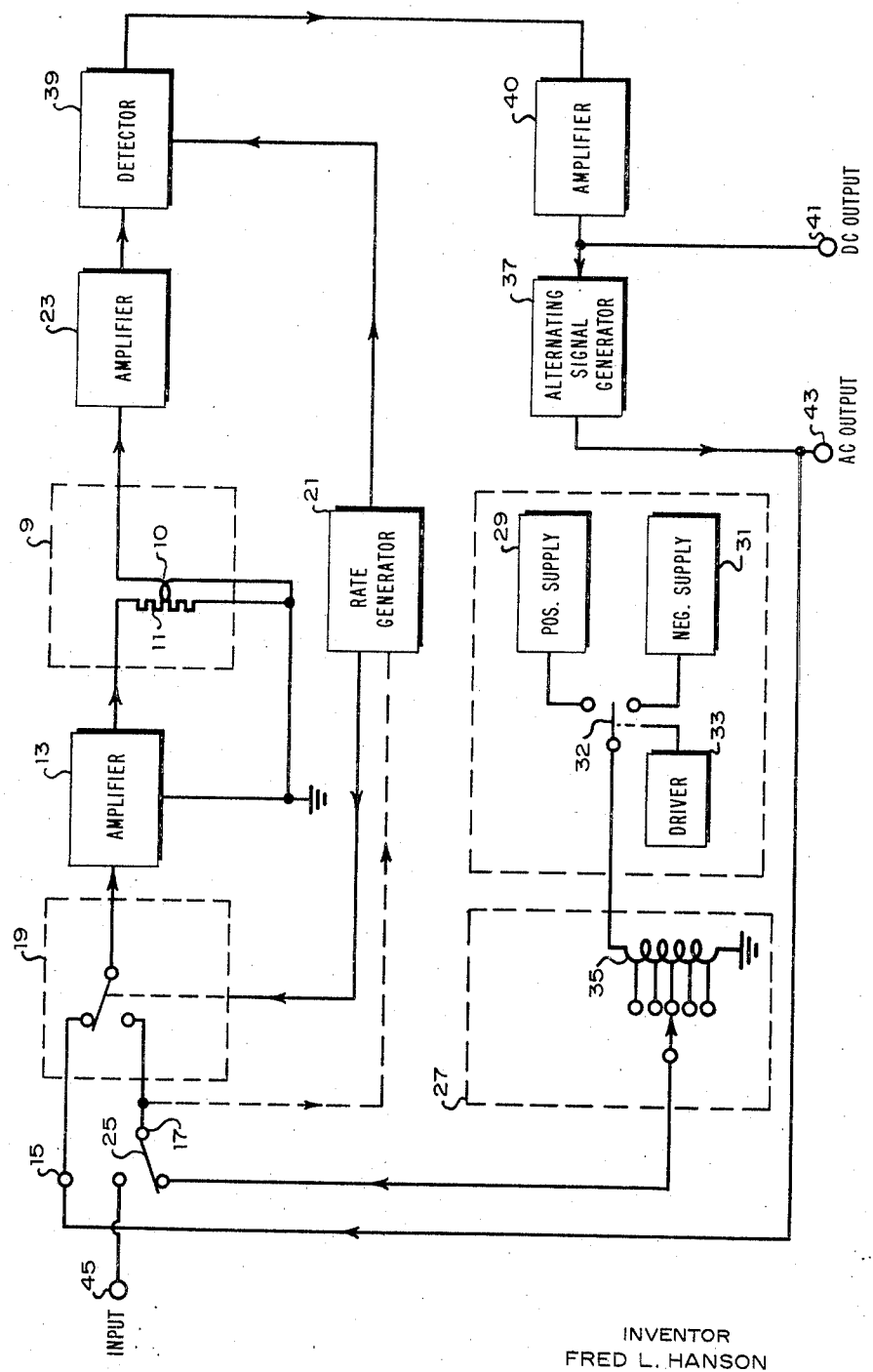

3,484,705
TRUE R.M.S. DETECTOR
Fred L. Hanson, Loveland, Colo., assignor to Hewlett-Packard Company, Palo Alto, Calif., a corporation of California
Filed June 23, 1966, Ser. No. 559,824
Int. Cl. H03k 5/20
U.S. Cl. 328—149                                        4 Claims

ABSTRACT OF THE DISCLOSURE

A true R.M.S. comparator alternately receives an alternating reference signal of accurately known R.M.S. value formed from positive and negative regulated reference voltages and also receives alternating signal from a controllable local oscillator. The R.M.S. difference between the alternating signals controls the local oscillator to produce an alternating output signal having an R.M.S. value very accurately related to the R.M.S. value of the reference signal.

---

This invention relates to true R.M.S. responsive apparatus and has as its principal object the provision of a true R.M.S. comparator for comparing the R.M.S. value of a known reference signal with the R.M.S. value of an unknown signal.

This is accomplished according to the embodiment of the invention that is illustrated in the accompanying drawing which shows a block diagram of the present invention by using a square wave of accurately known R.M.S. value as the reference signal and by comparing this signal on a time-shared basis with an unknown signal in an R.M.S. comparator such as a thermocouple.

In the drawing, there is shown a true R.M.S. responsive device 9 such as a thermocouple 10 havnig a heater 11 connected to receive the output of amplifier 13. This amplifier receives the signals appearing at each of the terminals 15 and 17 through switch 19 which alternates between these terminals at a rate determined by rate generator 21, typically about a one second rate. The signal from thermocouple 10 is thus related to the heating or true R.M.S. value of the one of the signals from terminals 15 and 17 which is applied to heater 11. The difference in true R.M.S. values of these signals appears as an output from thermocouple 10 which alternates at the rate determined by generator 21 between two levels above a reference level Amplifier 23 is responsive only to the alternating component of the thermocouple output such that the amplifier output approaches zero as the R.M.S. values of the signals at terminals 15 and 17 approach parity.

In operation, the described element may function as an accurately calibrated alternating signal source with switch 25 set to receive the signal from divider 27. A pair of regulated D.C. power supplies 29, 31 of opposite polarity are alternately connected to the divider 27 by switch 32 which is operated rapidly at about a one hundred cycle rate between alternate circuit connections by the driver source 33. This supplies a square wave of highly accurately known R.M.S. value to the divider 27 which includes magnetically coupled input and output windings on toroidal cores 35 for dividing the square wave signal by the precise integer numbers of the ratio of turns on a toroidal core inductive element 35. The output of the divider 27 appearing on terminal 17 thus serves as a reference signal of known R.M.S. value which is compared with the signal appearing on terminal 15 from the alternating signal generator 37. The difference in the true R.M.S. values of these signals produces an alternating signal at the output of amplifier 23, as previously described. This output is applied to detector 39 which operates in synchronism with switch 19 to produce a D.C. output 41 related to the difference between the R.M.S. values of the signals at terminals 15 and 17. Generator 37 responds to the D.C. output 41 by varying amplitude (or wave shape) in proper phase relationship to balance out the R.M.S. value of the reference square wave from divider 27. In this operating mode, the present invention provides an alternating output 43 of any selected wave shape having an R.M.S. value which is proportional to the R.M.S. value of the square wave applied to the divider 27.

With switch 25 set to connect the input terminal 45 to terminal 17, the present invention may be used as a true R.M.S. Converter and meter. The generator 37 provides an alternating signal of known R.M.S. value for a given value of applied D.C. signal from the detector 39 and amplifier 40. Ideally, generator 37 need only supply a square wave which has a peak-to-peak value that is proportional to the D.C. from amplifier 40. Thus, for very high gain around the loop, the output of detector 39 will approach zero as the R.M.S. values of the signals at terminals 15 and 17 approach parity, thereby establishing that the R.M.S. value of the signal at input terminal 45 is substantially equal to the R.M.S. value of the signal from generator 37. However, since the relationship of this signal to the D.C. signal from amplifier 40 is known, the D.C. output at terminal 41 is proportional to the R.M.S. value of the input signal and may be accurately metered using conventional means. Rate generator 21 may be connected to receive the signal at terminal 17 for synchronous operation on alternating signal such that an integer number of cycles of signal is observed to improve the operating accuracy on low frequency signal.

Therefore, the detector of the present invention uses a single signal channel to compare the R.M.S. value of a pair of signals on a time-shared basis. Differences in the compared R.M.S. values produce a unidirectional signal of related phase and amplitude which may be used as a feedback control signal for maintaining the R.M.S. value of one signal substantially equal to the R.M.S. value of a signal compared therewith.

I claim:
1. Signal detector apparatus comprising:
   sensing means for producing an output related to the R.M.S. value of a signal applied thereto;
   a pair of terminals;
   means connected to said sensing means for alternately connecting each of said terminals to said sensing means to apply thereto the signals appearing at said terminals;
   circuit means including a detector operating in synchronism with the alternate connection of said terminals to said sensing means for producing an output which is related to the difference between the R.M.S. value of the signals at said terminals;
   a first source of alternating signal having an R.M.S. value related to an applied control signal, said first source being connected to one of said pair of terminals for comparison with the R.M.S. value of a signal appearing on the other of said pair of terminals; and
   means responsive to said output from said circuit means for applying control signal to said first source for altering the R.M.S. value of the alternating signal from said first source to substantially equal the R.M.S. value of signal appearing on the other of said pair of terminals.
2. Signal detector apparatus as in claim 1 comprising:
   a second source of alternating reference signal con- nected to the other of said pair of terminals, said reference signal having a substantially square waveform of selected R.M.S. value.

3. Signal detector apparatus as in claim 2 wherein:
said second source of reference signal includes a unidirectional supply of signal of positive polarity and a unidirectional supply of signal of negative polarity; and
coupling means connects the other of said pair of terminals alternately and cyclically to each of the unidirectional signal supplies of positive and negative polarity.

4. Signal detector apparatus as in claim 3 wherein:
said coupling means includes an inductive signal divider comprising an input signal winding magnetically coupled to an output signal winding having a plurality of selectable winding taps for dividing the reference signal by a selectable ratio of the turns on the input and output signal windings.

References Cited

UNITED STATES PATENTS 3,213,364 10/1965 Miller et al. _____ 324—99 X
3,273,059 9/1966 Andersen et al. ____ 324—99 X JOHN S. HEYMAN, Primary Examiner B. P. DAVIS, Assistant Examiner U.S. Cl. X.R.

304—99; 307—310; 324—106